US011243548B2

United States Patent
Di Loreto et al.

(10) Patent No.: US 11,243,548 B2
(45) Date of Patent: Feb. 8, 2022

(54) DETECTING AUTONOMOUS VEHICLES CAUSING INCREASED VEHICLE QUEUEING

(71) Applicant: International Business Machines Corporation, Armonk, NY (US)

(72) Inventors: Anthony Di Loreto, Markham (CA); Kyle D. Robeson, North York (CA); Ben Z. Akselrod, Givat Shmuel (IL); Steve McDuff, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/737,011

(22) Filed: Jan. 8, 2020

(65) Prior Publication Data

US 2021/0208601 A1 Jul. 8, 2021

(51) Int. Cl.
  *G05D 1/00* (2006.01)
  *G05D 1/02* (2020.01)
  *H04W 4/46* (2018.01)
  *H04W 4/021* (2018.01)

(52) U.S. Cl.
  CPC ......... *G05D 1/0293* (2013.01); *G05D 1/0238* (2013.01); *G05D 1/0246* (2013.01);
  (Continued)

(58) Field of Classification Search
  CPC .. G05D 1/0293; G05D 1/0246; G05D 1/0278; G05D 1/0238; H04W 4/46; H04W 4/021
  See application file for complete search history.

(56) References Cited

U.S. PATENT DOCUMENTS

| 8,996,224 B1 * | 3/2015 | Herbach | G05D 1/0044 701/23 |
| 2017/0123429 A1 * | 5/2017 | Levinson | G01C 21/34 |

(Continued)

FOREIGN PATENT DOCUMENTS

| CN | 109460036 A | * 3/2019 |
| JP | 2018180810 A | 11/2018 |

(Continued)

OTHER PUBLICATIONS

"How Autonomous Vehicles Could Relieve or Worsen Traffic Congestion", SBD, HERE, Executive Summary, 19 pps., © 2017 Here, <https://www.here.com/sites/g/files/odxslz166/files/2018-12/HERE_How_autonomous_vehicles_could_relieve_or_worsen_traffic_congestion_white_paper.pdf>.

(Continued)

*Primary Examiner* — Peter D Nolan
*Assistant Examiner* — Peter Y Ning
(74) *Attorney, Agent, or Firm* — Michael A. Petrocelli

(57) ABSTRACT

Aspects of the present invention disclose a method for identifying autonomous vehicles that are causing traffic congestion due to anticipation of a pick-up event. The method includes one or more processors obtaining data of one or more sensors of an autonomous vehicle. The method further includes obtaining video data of a location that includes the autonomous vehicle. The method further includes determining a route of the autonomous vehicle based at least in part on the video data of the location that includes the autonomous vehicle. The method further includes determining whether the autonomous vehicle is performing a traffic infraction based at least in part on the route of the autonomous vehicle.

14 Claims, 3 Drawing Sheets

(52) U.S. Cl.
CPC .......... *G05D 1/0278* (2013.01); *H04W 4/021* (2013.01); *H04W 4/46* (2018.02)

(56) References Cited

U.S. PATENT DOCUMENTS

| | | | | |
|---|---|---|---|---|
| 2018/0113450 | A1* | 4/2018 | Sherony | G01C 21/3691 |
| 2018/0174451 | A1* | 6/2018 | Rao | G05D 1/0088 |
| 2019/0051159 | A1* | 2/2019 | Wang | G05D 1/0027 |
| 2019/0310654 | A1* | 10/2019 | Halder | G05D 1/0088 |
| 2019/0339709 | A1* | 11/2019 | Tay | G05D 1/0088 |
| 2020/0066147 | A1* | 2/2020 | Vadillo | H04W 4/022 |
| 2020/0242922 | A1* | 7/2020 | Dulberg | G08G 1/164 |

FOREIGN PATENT DOCUMENTS

| | | |
|---|---|---|
| KR | 101921168 B1 | 11/2018 |
| WO | 2019043446 A1 | 3/2019 |

OTHER PUBLICATIONS

Boran, "Sneaky self-driving car owners could cause 'havoc'", The Irish Times, Thu, Feb. 7, 2019, 2 pps., <https://www.irishtimes.com/business/technology/sneaky-self-driving-car-owners-could-cause-havoc-1.3784142>.

Mauracher et al., "Self-driving vehicles could clog Canada's streets, expeds warn", Global News, Updated May 26, 2019, 14 pps., <https://globalnews.ca/news/5317421/autonomous-vehicles-traffic-congestion-warning>.

Millard-Ball, "Autonomous Vehicle Parking Gridlock", Transportation Research Board 98th Annual Meeting, TRID the TRIS and ITRD database, Dec. 7, 2018, <https://trid.trb.org/view/1572240>.

Torbet, Feb. 3, 2019, Digital Trends, 11 pages, "Autonomous vehicles could cause gridlock by trying to avoid parking fees", <https://www.digitaltrends.com/cars/autonomous-vehicles-parking-fees/>.

* cited by examiner

DETECTING AUTONOMOUS VEHICLES CAUSING INCREASED VEHICLE QUEUEING

BACKGROUND OF THE INVENTION

The present invention relates generally to the field of information and communication technology, and more particularly to identifying autonomous vehicles contributing to traffic congestion.

In recent years, developments in advanced controls systems have provided autonomous vehicles to operate safely with little or no human input. An autonomous vehicle is a vehicle capable of sensing a surrounding environment and operating without human involvement. Additionally, a human passenger is not required to take control of the vehicle at any time, nor is a human passenger required to be present in the vehicle at all. Autonomous vehicles combine a variety of sensors to perceive the surroundings environment, such as radar, lidar, sonar, global positioning system (GPS), odometry, and inertial measurement units. Autonomous vehicles utilize advanced control systems interpret sensory information to identify appropriate navigation paths, as well as obstacles and relevant signage.

A Smart city is an urban area that uses different types of electronic Internet of Things (IoT) sensors to collect data and use insights gained from that data to manage assets, resources and services efficiently. This includes data collected from citizens, devices, and assets that is processed and analyzed to monitor and manage traffic and transportation systems. The smart city concept integrates information and communication technology (ICT), and various physical devices connected to the IoT network to optimize the efficiency of city operations and services and connect to citizens. Smart city technology allows city officials to interact directly with both community and city infrastructure and to monitor what is happening in the city and how the city is evolving.

SUMMARY

Aspects of the present invention disclose a method, computer program product, and system for identifying autonomous vehicles that are causing traffic congestion due to anticipation of a pick-up event. The method includes one or more processors obtaining data of one or more sensors of an autonomous vehicle. The method further includes one or more processors obtaining video data of a location that includes the autonomous vehicle. The method further includes one or more processors determining a route of the autonomous vehicle based at least in part on the video data of the location that includes the autonomous vehicle. The method further includes one or more processors determining whether the autonomous vehicle is performing a traffic infraction based at least in part on the route of the autonomous vehicle.

DETAILED DESCRIPTION

Embodiments of the present invention allow for identifying autonomous vehicles moving about a predetermined location that give rise to continuous queues of vehicles blocking an entire network of intersecting streets, bringing traffic in all directions to a complete standstill. Embodiments of the present invention utilize sensor data of devices proximate to a predetermined location to identify a route of autonomous vehicles. Embodiments of the present invention identify autonomous vehicles that are traveling in a holding pattern. Additional embodiments of the present invention generate and delivers a notification that includes facts corresponding to the identified autonomous vehicles.

Some embodiments of the present invention recognize that current traffic monitoring systems lack the ability to identify autonomous vehicles utilizing travel patterns that are causing traffic congestion in anticipation of a pickup event. For example, as autonomous vehicles become more prevalent, owners may provide instructions for pickups from a predetermined location at a future time. Thus, the autonomous vehicle may circle the pickup location to promptly arrive at the pickup location in anticipation of the pick-up request, especially in areas where parking is not available or costly. Furthermore, the autonomous vehicle may also make use of traffic congestion, by purposely traveling along congested routes to reduce the amount of circling to conserve resources of the vehicle. However, this type of behavior would increase overall congestion, be a detriment to the environment, and would also increase the likelihood gridlock if autonomous vehicles and owners chose such courses of action as a solution. Various embodiments of the present invention provide a monitoring solution for this behavior by utilizing sensor data proximate to a predetermined location and the autonomous vehicles to identify autonomous vehicles traveling in a holding pattern and provide all corresponding data to appropriate individuals or groups of individuals.

Various embodiments of the present invention can operate to prevent reduced data speeds and connectivity loss due to increase traffic of a router of a municipal area network (MAN) caused by autonomous vehicles with suspended travel progress by identifying and reporting the autonomous vehicles to authorities, which reduces the traffic of the router at a predetermined location of the MAN. Thus, improving the efficiency of a network at a predetermined location of the MAN. Embodiments of the present invention improve current traffic monitoring systems by adding the ability to identify vehicles that are causing congestion of traffic routes and not only traffic infractions.

Implementation of embodiments of the invention may take a variety of forms, and exemplary implementation details are discussed subsequently with reference to the Figures.

Figure 1:
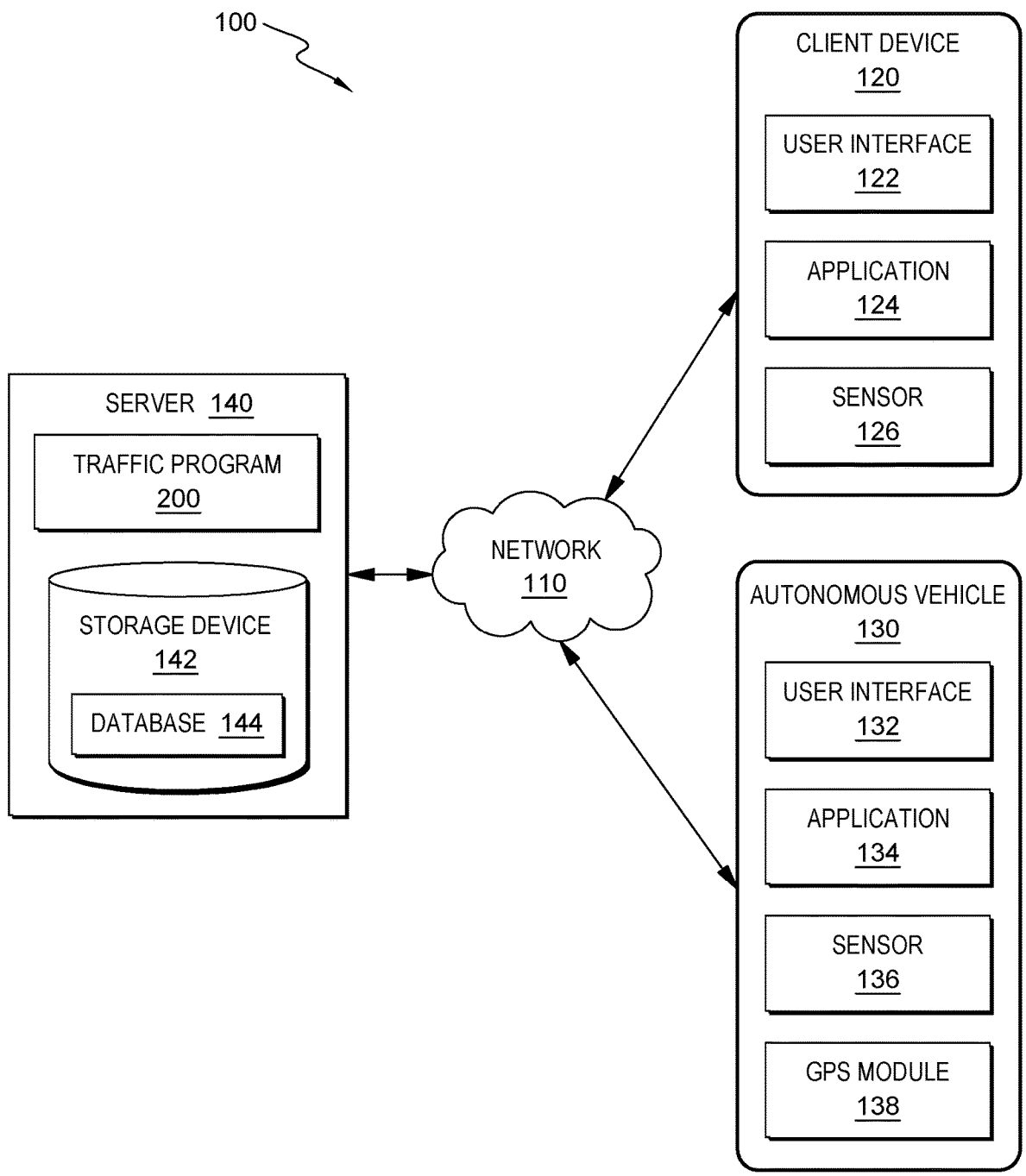
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Traffic program 200 enables the authorized and secure processing of personal data. Traffic program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Traffic program 200 provides information regarding personal data and the nature (e.g., type, scope, purpose, duration, etc.) of the processing. Traffic program 200 provides the user with copies of stored personal data. Traffic program 200 allows the correction or completion of incorrect or incomplete personal data. Traffic program 200 allows the immediate deletion of personal data.

Distributed data processing environment 100 includes server 140, autonomous vehicle 130, and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, autonomous vehicle 130, client device 120, and other computing devices (not shown) within distributed data processing environment 100.

Client device 120 can be one or more of a laptop computer, a tablet computer, a smart phone, smart watch, a smart speaker, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 may include one or more a processor, user interface 122, application 124, and sensor 126. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program.

Sensor 126 is a device, module, machine, or subsystem whose purpose is to detect events or changes in its environment and send the information to other electronics, frequently a computer processor. In one embodiment, client device 120 transmits data of sensor 126 to server 140 via network 110. For example, sensor 126 is a camera in a traffic light (e.g., client device 120) at an intersection near a shopping market that transmits images of vehicles traveling through the intersection to traffic program 200. In another embodiment, a user authorizes traffic program 200 to collect and process data of sensor 126. For example, a user opts-in to traffic program 200 to allow traffic program 200 to collect images of a camera (e.g., sensor 126) in a traffic light (e.g., client device 120) to utilize in various embodiments of the present invention.

Autonomous vehicle 130 is a vehicle that is capable of sensing its environment and moving safely with little or no human input capable of communicating with various components and devices within distributed data processing environment 100, via network 110. In general, autonomous vehicle 130 represents one or more vehicles, programmable electronic devices, and/or combination of programmable electronic devices capable of executing machine readable program instructions and communicating with other computing devices (not shown) within distributed data processing environment 100 via a network, such as network 110. Autonomous vehicle 130 may include components as depicted and described in further detail with respect to FIG. 3, in accordance with embodiments of the present invention.

Autonomous vehicle 130 may include one or more a processor, user interface 132, application 134, sensor 136, and GPS 138. User interface 132 is a program that provides an interface between a user of autonomous vehicle 130 and a plurality of applications that reside on autonomous vehicle 130. A user interface, such as user interface 132, refers to the information (such as graphic, text, and sound) that a program presents to a user, and the control sequences the user employs to control the program. A variety of types of user interfaces exist. In one embodiment, user interface 132 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 132 is a script or application programming interface (API).

Application 134 is a computer program designed to run on autonomous vehicle 130. An application frequently serves to provide a user with similar services accessed on personal computers (e.g., web browser, playing music, or other media, etc.). In one embodiment, application 134 is a web user interface (WUI) and can display text, documents, web browser windows, user options, application interfaces, and instructions for operation, and include the information (such as graphic, text, and sound) that a program presents to a user and the control sequences the user employs to control the program.

Sensor 136 represents a variety of sensors of autonomous vehicle 130 that collects and provides various kinds of data (e.g., proximity, infrared, image, motion, acceleration, radar, light, etc.). In one embodiment, sensor 136 provides information about autonomous vehicle 130 to server 140. In another embodiment, sensor 136 may communicate with application 136 which is capable of vehicle-to-vehicle communication (V2V) and provides information about autonomous vehicle 130 to a second autonomous vehicle (not shown). For example, sensor 136 provides speed, route, traffic, and braking data (e.g., information) of a first autonomous vehicle (e.g., autonomous vehicle 130) to application 124, which transmits the information to a second autonomous vehicle via near field communications (e.g., network 110). In another embodiment, a user authorizes traffic program 200 to collect and process data of sensor 136. For example, an owner of an autonomous vehicle opts-in to traffic program 200 to allow traffic program 200 to collect speed, route, traffic, and braking data (e.g., information) of the autonomous vehicle to utilize in various embodiments of the present invention.

GPS 138 is a global navigation system that provides geolocation information of an object. In one embodiment, GPS 138 provides geolocation information of autonomous vehicle 130 to traffic program 200. For example, a geo-spatial metrics module (e.g., GPS 138) provides real-time geolocation data for an autonomous vehicle (e.g., autonomous vehicle 130) to traffic program 200. In another example, a geo-spatial metrics module (e.g., GPS 138) provides real-time geolocation data for a first autonomous vehicle (e.g., autonomous vehicle 130) to a second autonomous vehicle.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120, autonomous vehicle 130, and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and traffic program 200. Storage device 142 can be implemented with any type of storage device, for example, persistent storage 305, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores a plurality of information, such as database 144. Database 144 may represent one or more organized collections of data stored and accessed from server 140. For example, database 144 includes travel routes, images of vehicles, speed, GPS location, and/or V2V communication data. In one embodiment, data processing environment 100 can include additional servers (not shown) that host additional information that accessible via network 110.

Generally, autonomous vehicles become prevalent new laws will be created to govern the use of autonomous vehicles, such as laws would most likely include the area of circling or congestion prevention (i.e., similar carpool laws). Due to this, traffic program 200 provides a means of detecting and reacting to such infractions by autonomous vehicles. In general, traffic program 200 identifies autonomous vehicles that are causing traffic congestion (e.g., slowdowns, gridlock, etc.) due to anticipation of a pick-up event and notifies an appropriate authority of circumstances corresponding to the traffic congestion.

In various embodiments of the present invention traffic program 200 can utilize sensor data of an autonomous vehicle or a device that is publicly available to detect infractions (e.g., circling, purposely increasing traffic congestion, etc.) of the autonomous vehicle. In one embodiment, traffic program 200 identifies autonomous vehicle 130 utilizing data of sensor 126. For example, traffic program 200 retrieves images from a camera of a traffic signal (e.g., client device 120) located at an intersection near a shopping center. In this example, traffic program 200 detects that a vehicle (e.g., autonomous vehicle 130) in the images does not have any passengers and determines a make and model of the vehicle. Additionally, traffic program 200 may utilize optical character recognition to extract a license plate number of the vehicle.

In another embodiment, traffic program 200 determines a route of autonomous vehicle 130 utilizing data of sensor 126. For example, traffic program 200 monitors traffic at an intersection to determine whether an identified vehicle is detected several times during a defined time period. In another example, traffic program 200 may retrieve route information from a V2V communication module (e.g., application 134) of an identified autonomous vehicle. In yet another embodiment, traffic program 200 generates a notification utilizing data of database 144. For example, traffic program 200 retrieves data corresponding to an identified autonomous vehicle (e.g., autonomous vehicle 130) from a database (e.g., database 144) to generate a notification that includes circumstances of an infraction and transmit the notification to an owner of the identified autonomous vehicle or authorities.

Figure 2:
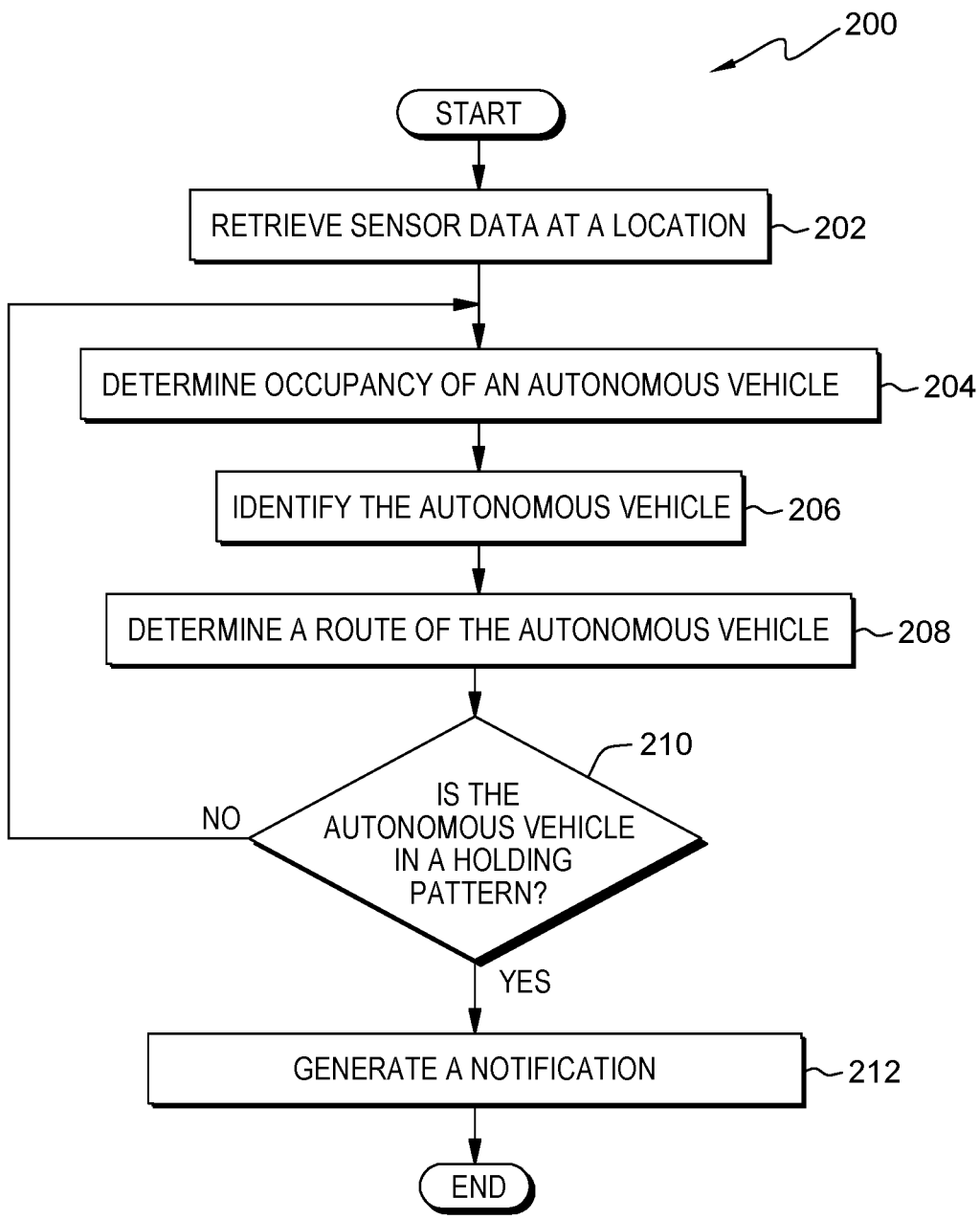
FIG. 2 is a flowchart depicting operational steps of a program, within the data processing environment of FIG. 1, for identifying autonomous vehicles that are causing traffic congestion due to anticipation of a pick-up event, in accordance with embodiments of the present invention.

FIG. 2 is a flowchart depicting operational steps of traffic program 200, a program that identifies autonomous vehicles that are causing traffic congestion due to anticipation of a pick-up event, in accordance with embodiments of the present invention. In one embodiment, traffic program 200 initiates in response to retrieving data of client device 120. For example, traffic program 200 initiates in response to retrieving video data of a traffic signal (e.g., client device 120) that includes one or more vehicles. In another embodiment, traffic program 200 monitors client device 120 and autonomous vehicle 130 at defined time periods. For example, traffic program 200 monitors a camera of traffic signal (e.g., client device 120) at time periods where traffic volume is high (i.e., rush hour).

In step 202, traffic program 200 retrieves sensor data at a location. In various embodiments of the present invention, traffic program 200 can utilize publicly available sensors or internal sensors of an autonomous vehicle to monitor autonomous vehicles in the flow of traffic for indications of circling or purposely increasing traffic congestion. In one embodiment, traffic program 200 retrieves data of sensor 126 of client device 120. For example, traffic program 200 retrieves video data of a camera (e.g., sensor 126) of a traffic signal (e.g., client device 120) and stores a plurality of images of the video data in a database (e.g., database 144). In this example, traffic program 200 may retrieve images from publicly available closed-circuit television (CCTV) systems as well.

In another embodiment, traffic program 200 retrieves data of sensor 136 of autonomous vehicle 130. For example, traffic program 200 retrieves data (e.g., V2V data, GPS, speed, routes, identifiers, etc.) of sensors (e.g., sensor 136) and applications (e.g., application 134) within a self-driving car (e.g., autonomous vehicle 130). In this example, an owner of the self-driving car opts-in to allow traffic program 200 to retrieve data that includes identifying information (e.g., yin number, license plate number, registration information, etc.) about the self-driving car. In another embodiment, traffic program 200 retrieves of data one or more sensor(s) (e.g., sensor 126, sensor 136, sensor not shown, etc.) and/or applications (e.g., application 124, application 134, etc.).

In step 204, traffic program 200 determines occupancy of an autonomous vehicle. In one embodiment, traffic program 200 utilizes data of sensor 126 to determine occupancy of autonomous vehicle 130. For example, traffic program 200 retrieves video data of a camera (e.g., sensor 126) of a traffic signal (e.g., client device 120) and utilizes object recognition to detect whether a person is present in a self-driving car (e.g., autonomous vehicle 130) or in includes cargo. In another embodiment, traffic program 200 utilizes video data of a CCTV system and optical character recognition to determine whether a self-driving car (e.g., autonomous vehicle 130) includes signage (e.g., vacancy sign) that indicates occupancy of the self-driving car. In another embodiment, traffic program 200 utilizes data of autonomous vehicle 130 to determine occupancy autonomous vehicle 130. For example, traffic program 200 retrieves data of pressure sensor of a seat of a self-driving car (e.g., autonomous vehicle 130) to determine whether a person occupies the self-driving car.

In step 206, traffic program 200 identifies the autonomous vehicle. In one embodiment, traffic program 200 utilizes data of client device 120 to identify autonomous vehicle 130. For example, traffic program 200 utilizes optical character recognition to identify one or more self-driving cars (e.g., autonomous vehicle 130). In this example, traffic program 200 retrieves video data from a traffic camera (e.g., client device 120) and extracts licenses plate numbers of the one or more self-driving cars determined to be vacant (based on occupancy determined in step 204). Additionally, traffic program 200 registers the identified vehicle by storing the identification information of the self-driving car in a database (e.g., database 144). In an alternative example, traffic program 200 retrieves one or more images of a self-driving car from a database (e.g., database 144) of vacant self-driving cars.

In another embodiment, traffic program 200 utilizes data of autonomous vehicle 130 to identify autonomous vehicle 130. For example, traffic program 200 utilizes natural language processing (NLP) techniques to identify a self-driving car. In this example, traffic program 200 retrieves data of V2V communications of the self-driving car (e.g., autonomous vehicle 130) and parses textual data of the V2V communications to extract identifiers (e.g., vehicle identification numbers, registration data, etc.) of the self-driving car.

In step 208, traffic program 200 determines a route of the autonomous vehicle. In one embodiment, traffic program 200 utilizes data of autonomous vehicle 130 to determine a route of autonomous vehicle 130. For example, an owner of a self-driving car (e.g., autonomous vehicle 130) arrives at a predetermined destination. The owner then dispatches the self-driving car to drive for one (1) hour using an application (e.g., application 134) of the self-driving car and return to the predetermined destination to pick the owner up at the predetermined destination, avoiding a repeating pattern. In this example, traffic program 200 queries the self-driving car and retrieves a route information of the navigation system (e.g., application 134), and then determines that the self-driving car selected a route to drive in one direction for thirty (30) minutes and return to the predetermined location using a path that takes thirty (30) minutes.

Additionally, traffic program 200 utilizes vehicle telematics to monitor the self-driving car as the self-driving car reports metrics (e.g., location, destination, number of passengers, speed, etc.) of the trip (i.e., traffic program 200 utilizes telemetric data of the self-driving car to identify a route of the car). Vehicle telematics is a method of monitoring and harvesting data from any moving asset, like a car, truck, or heavy equipment by using GPS and onboard diagnostics to record movements and vehicle condition at points in time.

In another embodiment, traffic program 200 utilizes data of client device 120 to determine a route of autonomous vehicle 130. For example, an owner of a self-driving car (e.g., autonomous vehicle 130) arrives at a location, dispatches the self-driving car to circle the location for one (1) hour, and return to the location to pick the owner up. In this example, traffic program 200 utilizes video data of CCTV of traffic cameras (e.g., client device 120) to capture multiple images of the self-driving car as the self-driving car travels along a route within the field of view of the CCTV around the location multiple times. Additionally, traffic program 200 determines that the route of the self-driving car includes a path that traverses streets around the location.

In decision step 210, traffic program 200 determines whether the autonomous vehicle is in a holding pattern. Generally, a holding pattern is a route maintained by an autonomous vehicle that includes a state of intentional delay, suspended activity, and/or regression. In one embodiment, traffic program 200 utilizes data of client device 120 to determine whether autonomous vehicle 130 is traveling in a holding pattern about a location. For example, traffic program 200 uses images of video data of traffic camera (e.g., client device 120) to determine whether a self-driving car (e.g., autonomous vehicle 130) is in a holding pattern by detecting the number of times the self-driving car is present in an intersection (e.g., predetermined location) within a defined time interval.

In another embodiment, traffic program 200 utilizes data of autonomous vehicle 130 to determine whether autonomous vehicle 130 is traveling in a holding pattern about a location. For example, traffic program 200 uses sensor data, applications, and V2V data of a self-driving car (e.g., autonomous vehicle 130) to determine whether a self-driving car (e.g., autonomous vehicle 130) is in a holding pattern by determining whether a location of the last passenger drop-off and last passenger pick-up is within a threshold distance (e.g., one-hundred meters) of each other and the self-driving vehicle was not parked in a legal parking spot for more than a defined time period (e.g., thirty minutes).

If traffic program 200 determines that autonomous vehicle 130 is not traveling in a holding pattern about a location (decision step 210, "NO" branch), then traffic program 200 returns to step 204 and continues to identify vehicles about the location that do not include occupants. In one scenario, if traffic program 200 determines that a self-driving car (e.g., autonomous vehicle 130) is present in an intersection (e.g., predetermined location) one (1) time within a defined time interval (e.g., one hour), then traffic program 200 continues to monitor retrieved data of a traffic camera to detect an autonomous vehicle with that does not include occupants that is in a holding pattern about a predetermined location.

If traffic program 200 determines that autonomous vehicle 130 is traveling in a holding pattern about a location (decision step 210, "YES" branch), then traffic program 200 flags autonomous vehicle 130 and stores data corresponding to an infraction of autonomous vehicle 130. In one scenario, if traffic program 200 determines that a self-driving car (e.g., autonomous vehicle 130) is present in an intersection (e.g., predetermined location) four (4) times within a defined time interval (e.g., one hour), then traffic program 200 stores the identification of the self-driving car, the route traveled by the self-driving car, and the number of times the self-driving car traversed the intersection within the defined time interval and stores the information in a database (e.g., database 144).

In step 212, traffic program 200 generates a notification. In one embodiment, traffic program 200 utilizes data of database 144 to generate a notification of an infraction by autonomous vehicle 130. For example, traffic program 200 retrieves all data corresponding to a self-driving car flagged for a traffic infraction (e.g., circling, traveling in a holding pattern, purposely increasing traffic congestion). In this example, traffic program 200 transmits a notification to an individual or individuals (e.g., police, security, owners, other defined groups, etc.) that includes all evidence (e.g., route, identification, location, time, etc.) necessary to prove the traffic infraction occurred. Additionally, traffic program 200 notification deters self-driving cars from causing congestion on roads and the cumulative effects reduce bandwidth consumption of nodes of municipal area networks by the self-driving cars, which increases network efficiency.

Figure 3:
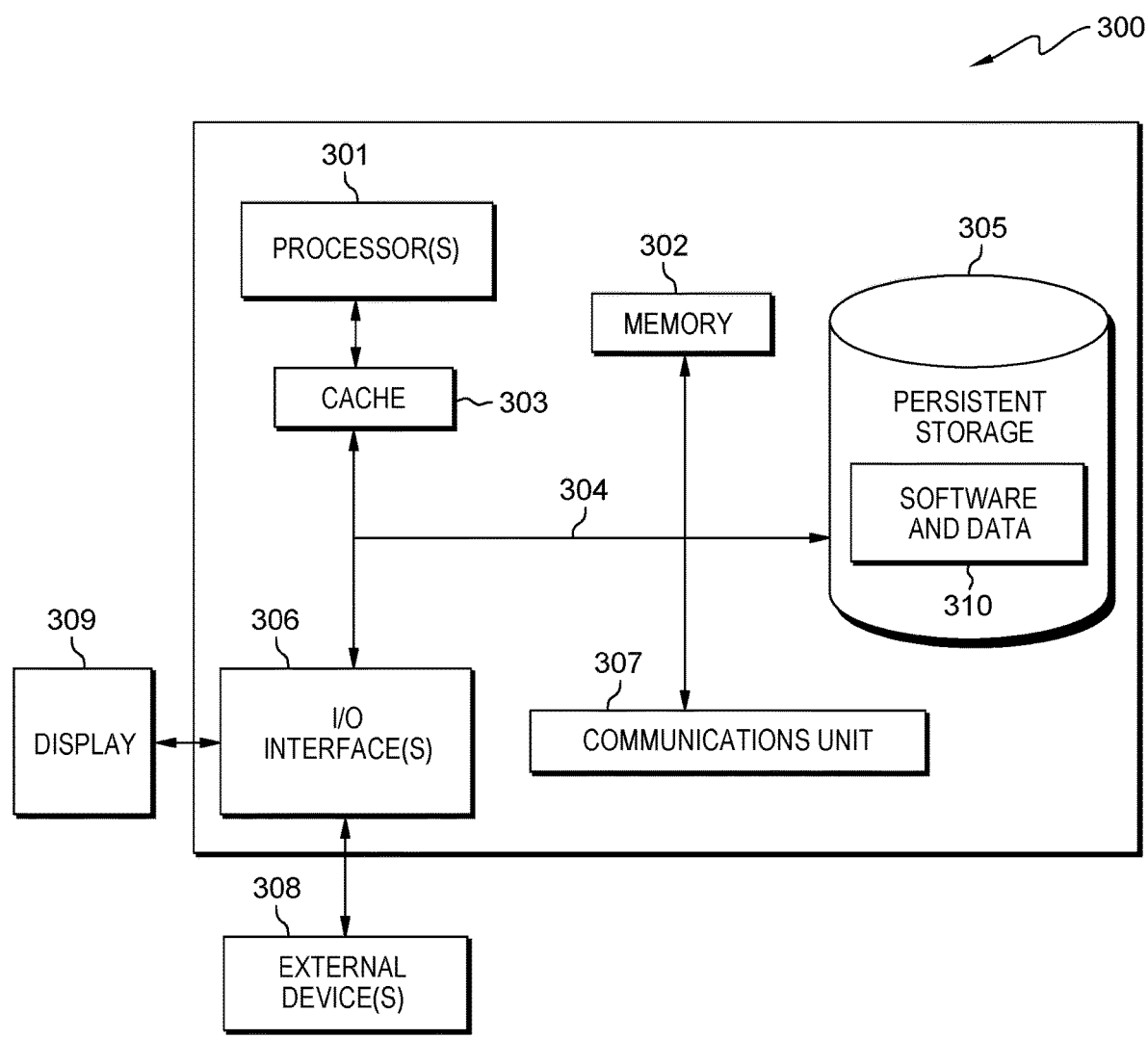
FIG. 3 is a block diagram of components of the client device and server of FIG. 1, in accordance with an embodiment of the present invention.

FIG. 3 depicts a block diagram of components of client device 120, autonomous vehicle 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122, application 124, and sensor 126. With respect to autonomous vehicle 130, software and data 310 includes data of user interface 132, application 134, sensor 136, and GPS 138. With respect to server 140, software and data 310 includes data of storage device 142 and traffic program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   obtaining, by one or more processors, data of one or more sensors of an autonomous vehicle;
   obtaining, by one or more processors, video data of a location that includes the autonomous vehicle;
   determining, by one or more processors, a route of the autonomous vehicle based at least in part on the video data of the location that includes the autonomous vehicle;
   determining, by one or more processors, whether the autonomous vehicle is performing a traffic infraction based at least in part on the route of the autonomous vehicle;
   wherein determining the route of the autonomous vehicle, further comprises:
   retrieving, by one or more processors, the data of one or more sensors of the autonomous vehicle that includes telematic data, wherein the telematic data includes global positioning system (GPS) navigation data and onboard diagnostics to record movements and condition at one or more points in time of the autonomous vehicle;
   extracting, by one or more processors, a present geolocation of the autonomous vehicle from the telematic data;
   extracting, by one or more processors, a future geolocation of the autonomous vehicle from the telematic data, wherein the future geolocation is a destination included in the GPS navigation data of the autonomous vehicle;
   identifying, by one or more processors, a path the autonomous vehicle selects to traverse from the present geolocation to the future geolocation; and
   wherein determining whether the autonomous vehicle is performing the traffic infraction based at least in part on the route of the autonomous vehicle, further comprises:
   comparing, by one or more processors, the present geolocation of the autonomous vehicle, the future geolocation of the autonomous vehicle, and the predetermined location; and
   determining, by one or more processors, whether the route of the autonomous vehicle is approximate to a holding pattern, wherein the holding pattern is a route maintained by the autonomous vehicle that results in a state selected from a group consisting of: intentional delay, suspended activity, and regression.

2. The method of claim 1, further comprising:
   determining, by one or more processors, an occupancy status of the autonomous vehicle based at least in part on the video data of the location that includes the autonomous vehicle; and
   responsive to determining that the autonomous vehicle is not occupied, identifying, by one or more processors, the autonomous vehicle.

3. The method of claim 1, further comprising:
   responsive to determining that the autonomous vehicle is performing the traffic infraction, providing, by one or more processors, a notification to a defined group, wherein the notification includes evidence of the traffic infraction, wherein the evidence includes the route, the data the one or more sensors, and the video data.

4. The method of claim 1, wherein data of one or more sensors of the autonomous vehicle includes sensor readings of the autonomous vehicle and vehicle-to-vehicle communications of the autonomous vehicle.

5. The method of claim 1, wherein determining the occupancy status of the autonomous vehicle, further comprises:
   extracting, by one or more processors, one or more images of the autonomous vehicle from video data of the computing device;
   detecting, by one or more processors, one or more objects present in the autonomous vehicle; and
   determining, by one or more processor, whether the one or more objects indicates a person is present in the autonomous vehicle.

6. A computer program product comprising:
   one or more computer readable storage media and program instructions stored on the one or more computer readable storage media, the program instructions comprising:
   program instructions to obtain data of one or more sensors of an autonomous vehicle;
   program instructions to obtain video data of a location that includes the autonomous vehicle;
   program instructions to determine a route of the autonomous vehicle based at least in part on the video data of the location that includes the autonomous vehicle;
   program instructions to determine whether the autonomous vehicle is performing a traffic infraction based at least in part on the route of the autonomous vehicle;
   wherein program instructions to determine the route of the autonomous vehicle, further comprise program instructions to:
   retrieve the data of one or more sensors of the autonomous vehicle that includes telematic data, wherein the telematic data includes global positioning system (GPS)

navigation data and onboard diagnostics to record movements and condition at one or more points in time of the autonomous vehicle;

extract a present geolocation of the autonomous vehicle from the telematic data;

extract a future geolocation of the autonomous vehicle from the telematic data, wherein the future geolocation is a destination included in the GPS navigation data of the autonomous vehicle;

identify a path the autonomous vehicle selects to traverse from the present geolocation to the future geolocation; and wherein program instructions to determine whether the autonomous vehicle is performing the traffic infraction based at least in part on the route of the autonomous vehicle, further comprise program instructions to:

compare the present geolocation of the autonomous vehicle, the future geolocation of the autonomous vehicle, and the predetermined location; and determine whether the route of the autonomous vehicle is approximate to a holding pattern, wherein the holding pattern is a route maintained by the autonomous vehicle that results in a state selected from a group consisting of: intentional delay, suspended activity, and regression.

7. The computer program product of claim 6, further comprising program instructions, stored on the one or more computer readable storage media, to:

determine an occupancy status of the autonomous vehicle based at least in part on the video data of the location that includes the autonomous vehicle; and responsive to determining that the autonomous vehicle is not occupied, identify the autonomous vehicle.

8. The computer program product of claim 6, further comprising program instructions, stored on the one or more computer readable storage media, to:

responsive to determining that the autonomous vehicle is performing the traffic infraction, provide a notification to a defined group, wherein the notification includes evidence of the traffic infraction, wherein the evidence includes the route, the data the one or more sensors, and the video data.

9. The computer program product of claim 6, wherein data of one or more sensors of the autonomous vehicle includes sensor readings of the autonomous vehicle and vehicle-to-vehicle communications of the autonomous vehicle.

10. The computer program product of claim 6, wherein program instructions to determine the occupancy status of the autonomous vehicle, further comprise program instructions to:

extract one or more images of the autonomous vehicle from video data of the computing device;

detect one or more objects present in the autonomous vehicle; and determine whether the one or more objects indicates a person is present in the autonomous vehicle.

11. A computer system comprising:
one or more computer processors;
one or more computer readable storage media; and
program instructions stored on the computer readable storage media for execution by at least one of the one or more processors, the program instructions comprising:

program instructions to obtain data of one or more sensors of an autonomous vehicle;

program instructions to obtain video data of a location that includes the autonomous vehicle;

program instructions to determine a route of the autonomous vehicle based at least in part on the video data of the location that includes the autonomous vehicle;

program instructions to determine whether the autonomous vehicle is performing a traffic infraction based at least in part on the route of the autonomous vehicle;

wherein program instructions to determine the route of the autonomous vehicle, further comprise program instructions to:

retrieve the data of one or more sensors of the autonomous vehicle that includes telematic data, wherein the telematic data includes global positioning system (GPS) navigation data and onboard diagnostics to record movements and condition at one or more points in time of the autonomous vehicle;

extract a present geolocation of the autonomous vehicle from the telematic data;

extract a future geolocation of the autonomous vehicle from the telematic data, wherein the future geolocation is a destination included in the GPS navigation data of the autonomous vehicle;

identify a path the autonomous vehicle selects to traverse from the present geolocation to the future geolocation; and wherein program instructions to determine whether the autonomous vehicle is performing the traffic infraction based at least in part on the route of the autonomous vehicle, further comprise program instructions to:

compare the present geolocation of the autonomous vehicle, the future geolocation of the autonomous vehicle, and the predetermined location; and determine whether the route of the autonomous vehicle is approximate to a holding pattern, wherein the holding pattern is a route maintained by the autonomous vehicle that results in a state selected from a group consisting of: intentional delay, suspended activity, and regression.

12. The computer system of claim 11, further comprising program instructions, stored on the one or more computer readable storage media for execution by at least one of the one or more processors, to:

determine an occupancy status of the autonomous vehicle based at least in part on the video data of the location that includes the autonomous vehicle; and responsive to determining that the autonomous vehicle is not occupied, identify the autonomous vehicle.

13. The computer system of claim 11, further comprising program instructions, stored on the one or more computer readable storage media for execution by at least one of the one or more processors, to:

responsive to determining that the autonomous vehicle is performing the traffic infraction, provide a notification to a defined group, wherein the notification includes evidence of the traffic infraction, wherein the evidence includes the route, the data the one or more sensors, and the video data.

14. The computer system of claim 11, wherein data of one or more sensors of the autonomous vehicle includes sensor readings of the autonomous vehicle and vehicle-to-vehicle communications of the autonomous vehicle.

\* \* \* \* \*